United States Patent
Yuuki et al.

(10) Patent No.: US 6,181,071 B1
(45) Date of Patent: Jan. 30, 2001

(54) DISPLAY PANEL APPARATUS HAVING REDUCED CAPACITIVE COUPLING

(75) Inventors: Akimasa Yuuki; Mitsumasa Umesaki; Sadayuki Matsumoto; Takashi Kumagai; Shin Kawabe, all of Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/031,609

(22) Filed: Feb. 27, 1998

(30) Foreign Application Priority Data

Feb. 28, 1997 (JP) .................................................. 9-045679

(51) Int. Cl.⁷ ............................. G02F 1/335; H05B 37/02
(52) U.S. Cl. ........................ 315/169.3; 315/224; 349/70
(58) Field of Search .................................. 349/65, 70, 60; 315/169.3, 224

(56) References Cited

U.S. PATENT DOCUMENTS

| | | | |
|---|---|---|---|
| 4,682,084 | * 7/1987 | Kuhnel et al. | 315/307 |
| 4,709,188 | * 11/1987 | Roberts | 315/178 |
| 5,121,032 | * 6/1992 | Han | 315/219 |
| 5,182,660 | * 1/1993 | Tanaka | 359/49 |
| 5,504,605 | * 4/1996 | Sakuma et al. | 359/83 |
| 5,754,012 | * 5/1998 | LoCascio et al. | 315/307 |
| 5,789,870 | * 8/1998 | Remson | 315/194 |

* cited by examiner

Primary Examiner—David Vu
(74) Attorney, Agent, or Firm—Oblon, Spivak, McClelland, Maier & Neustadt, P.C.

(57) ABSTRACT

A display panel with a reduced capacitive coupling. The panel includes a transmission type liquid crystal panel. A lamp is provided adjacent at least one side of a light guide plate to guide the light to the crystal panel. A high frequency current supply is used to power the light. A reflective plate encircles the lamp so as to introduce the light to the light guide plate. A housing is made of a thin metal plate. Each portion of the housing is connected with a common electrical potential. Part of the housing extends away from the reflective plate around the lamp or contains an opening in the same location. By this arrangement, the capacitance between the reflective plate and the housing is made smaller thus reducing the leakage current.

7 Claims, 15 Drawing Sheets

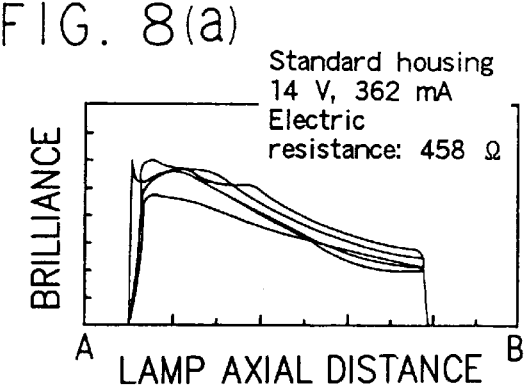
FIG. 8(a) Standard housing 14 V, 362 mA Electric resistance: 458 Ω
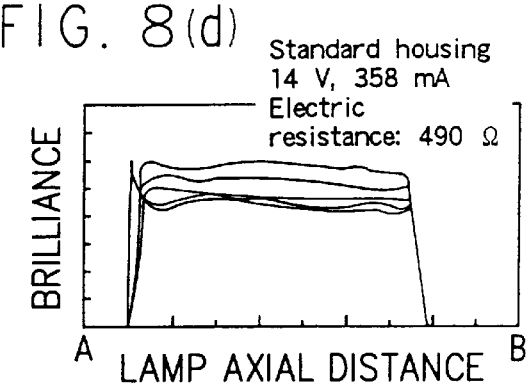
FIG. 8(d) Standard housing 14 V, 358 mA Electric resistance: 490 Ω
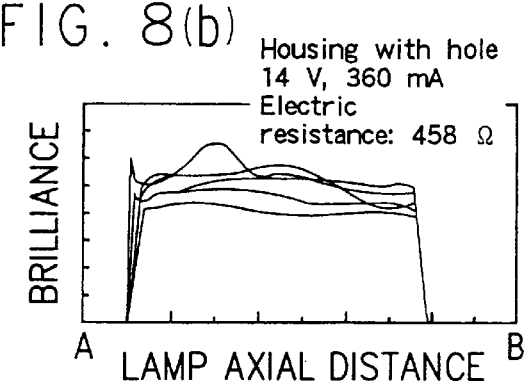
FIG. 8(b) Housing with hole 14 V, 360 mA Electric resistance: 458 Ω
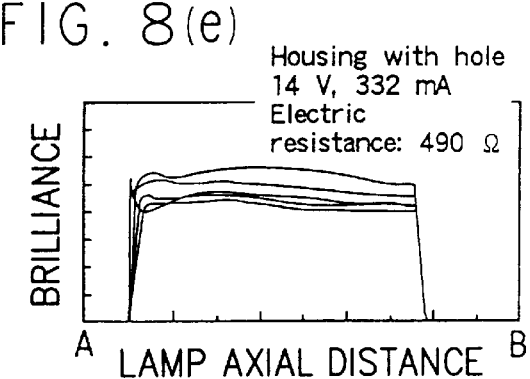
FIG. 8(e) Housing with hole 14 V, 332 mA Electric resistance: 490 Ω
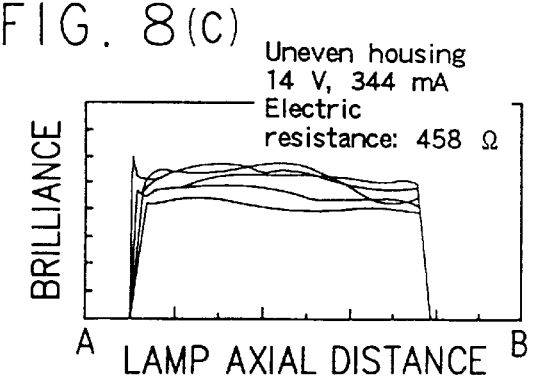
FIG. 8(c) Uneven housing 14 V, 344 mA Electric resistance: 458 Ω
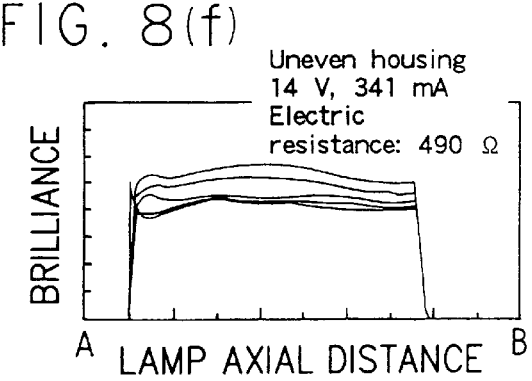
FIG. 8(f) Uneven housing 14 V, 341 mA Electric resistance: 490 Ω

DISPLAY PANEL APPARATUS HAVING REDUCED CAPACITIVE COUPLING

BACKGROUND OF THE INVENTION

The present invention relates to a liquid crystal display panel used in a display or the like of a computer, and more particularly, to a thinner display panel.

FIG. 14 is a basic configuration view of a conventional liquid crystal panel unit of a back light type described in, for example, page 337 of an additional edition of a monthly Semiconductor World "'95 Latest Liquid Crystal Process Art". Referring to the drawing, numeral 1 is a polarizer and numeral 2 is a liquid crystal panel composed of a color filter 3 and an array substrate 4. Numeral 5 is a driving circuit for image displaying connected with the array substrate 4. A back light comprises a diffusion sheet 6 for scattering and equalizing light, a light guide plate 7, a reflective sheet 8 placed on the reverse side of the light guide plate 7, a cold cathode tube (lamp) 9, and a reflective plate 10. Numeral 30 is an inverter for providing AC power of high voltage to the lamp 9.

FIG. 15 is a sectional view showing a comparative embodiment for explaining effects of the present invention. In FIG. 15, numeral 1 is a polarizer (thickness: 0.21 mm), and numeral 2 is a liquid crystal panel composed of a color filter 3 (thickness: 0.5 mm) and an array substrate 4 (thickness: 0.4 mm). Numeral 6 is a diffusion sheet (thickness: 0.14 mm); numeral 7 a light guide plate (thickness: 2 mm); numeral 8 a reflective sheet (thickness: 0.125 mm); numeral 9 a lamp (diameter: 2 mm); and numeral 10 an Ag reflective plate (thickness: 0.05 mm), respectively. Further, numeral 11 is an insulating film (thickness: 0.1 mm); numeral 12 a back metal plate (thickness: 3 mm) of a metal housing; numeral 13 a metal housing frame; numeral 14 a front metal plate (thickness: 3 mm) of the housing; numeral 15 a decorative sheet (thickness: 0.2 mm); numeral 16 two prism sheets each having a thickness of 0.16 mm; and numeral 17 a bonding material (thickness: 0.1 mm) respectively. Further, numerals 34 to 36 are a groove for allowing a low voltage wiring of the lamp to pass, plastic mold and a frame coated with black ink for preventing directly reflected light from the lamp from being observed, respectively. In FIG. 15, sizes of t11 to t15 and t17 to t22 are 0.5 mm (t11), 3.795 mm (t12), 0.3 mm (t13), 0.4 mm (t14), 0.2 mm (t5), 0.5 mm (t17), 3.995 mm (t18), 0.3 mm (t19), 1.62 mm (t20), 2 mm (t21) and 0.375 mm (t22: 0.1 mm of bonding material +0.125 mm of reflective sheet +0.05 mm of Ag sheet +0.1 mm of insulating film), respectively.

The operation of the panel unit will be described. A DC power of approximately 5 through 12 V to be provided from a battery is converted into an AC power of 40 through 200 kHz in frequency, and approximately 500 through 1500 V in effective voltage by the inverter 30 and is applied to the high voltage terminal of the lamp 9. The other end is earthed to allow the lamp 9 to emit light with potential distribution shown in FIG. 5. The light emitted from the lamp 9 enters into the light guide plate 7 and spreads on the whole face of the light guide plate 7 while being reflected by the reflective sheet 8. At this time, the periphery of the lamp 9 is surrounded by a reflective plate 10 so as to let more light enter into the light guide plate 7 without waste. In order to raise the reflectance, a sheet with silver being spattered on it is used as a reflective plate 10. Thus, a capacity coupling is formed among the lamp 9, silver reflective plate 10, and a housing metal portion adjacent thereto, and a leak pass of the high frequency power applied to the cold cathode tube is formed. The scattered dots are formed on the reverse face of the light guide plate 7. The light scattered at the reverse face of the light guide plate 7 and coming from the front face of the light guide plate 7 is scattered by the diffusion sheet 6 to be equalized. Furthermore, the light enters into a liquid crystal after the light have been throttled in a direction vertical to a panel face by a prism sheet. In the liquid crystal panel, after the incident light has been polarized by the polarizer 1, the polarization direction of the light is rotationally shifted for each dot in accordance with the image signal at the liquid crystal panel 2 to which the voltage has been applied with the driving circuit 5, and the light passes through a color filter. Finally, only the light rotated by 90 degrees in the polarization direction by a second polarization plate 1 which is an analyzer, can be transmitted.

In order to form a thin type liquid crystal display panel including an external panel, the liquid crystal display of a back light type has the following problems simultaneously with a problem of thinning.

(1) measures against electromagnetic injuries (EMI)

(2) reduction of consumption power (2 W or lower)

(3) impact resistance (not broken with impact of 200 G)

Accordingly, an object of the present invention is, in a panel module using a metal housing with a large impact resistance which becomes a stable ground and has an electromagnetic shielding function, to restrain increase of leakage current due to thinning from between a back light lamp and a panel housing to improve the equalization of lamp radiation, thereby reducing the load of a high frequency current supply circuit.

SUMMARY OF THE INVENTION

A display panel apparatus according to a first configuration of the present invention comprises a transmission type liquid crystal panel, a lamp provided adjacent to at least one side of a light guide plate for guiding illumination light to the crystal panel, a high frequency current supply for providing a lighting current to the lamp, a reflective plate provided to encircle the lamp to introduce illumination light of the lamp to the light guide plate, and a housing composed of a metal thin plate; wherein each portion of the housing is connected with a common electric potential, and a portion having a shape departing from the lamp is formed in a portion of the housing adjacent to the lamp.

A display panel apparatus according to a second configuration of the present invention comprises a transmission type liquid crystal panel, a lamp provided adjacent to at least one side of a light guide plate for guiding illumination light to the crystal panel, a high frequency current supply for providing a lighting current to the lamp, a reflective plate provided to encircle the lamp to introduce illumination light of the lamp to the light guide plate, and a housing composed of a metal thin plate; wherein each portion of the housing is connected with a common electric potential, and an opening is formed in a portion of the housing adjacent to the lamp.

In a display panel apparatus according to a third configuration of the present invention, the housing is formed of an insulating thin plate with a metal net being embedded in the plate, and each portion of the housing is connected with a common electric potential.

In a display panel apparatus according to a fourth configuration of the present invention, the reflective plate is composed of an insulating body with an insulating reflection material being applied thereon.

In a display panel apparatus according to a fifth configuration of the present invention, the reflective plate is formed with the use of a metal film divided into a plurality of areas which are electrically insulated to one another.

In a display panel apparatus according to a sixth configuration of the present invention, a common mode choke is inserted between the high frequency current supply and the lamp.

In a display panel apparatus according to a seventh configuration of the present invention, the high frequency current supply comprises a current supply of a type for alternately applying positive and negative voltages in antiphase to both ends of the lamp.

In a display panel apparatus according to a eighth configuration of the present invention, the swollen part of the housing is provided only in position opposite to both end portions of the lamp.

BRIEF DESCRIPTION OF THE DRAWINGS

FIGS. 8(a) to 8(f) are views each showing measured values of the axial brilliance distribution of a lamp which shows effect in Embodiment 1 of the present invention;

DETAILED DESCRIPTION OF THE INVENTION

Embodiment 1

Figure 1:
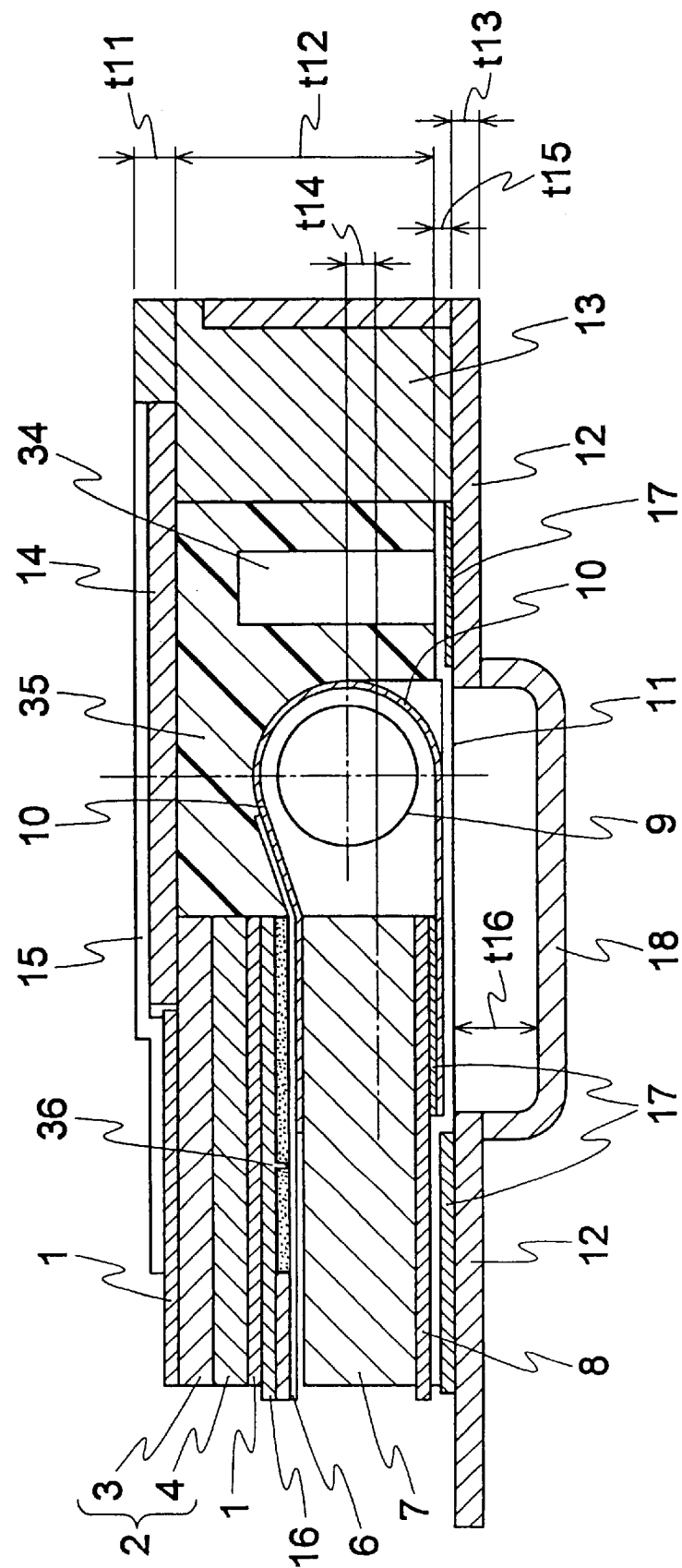
FIG. 1 is a sectional view showing the configuration of a lamp and its circumference in Embodiment 1 of the present invention.
Figure 2:
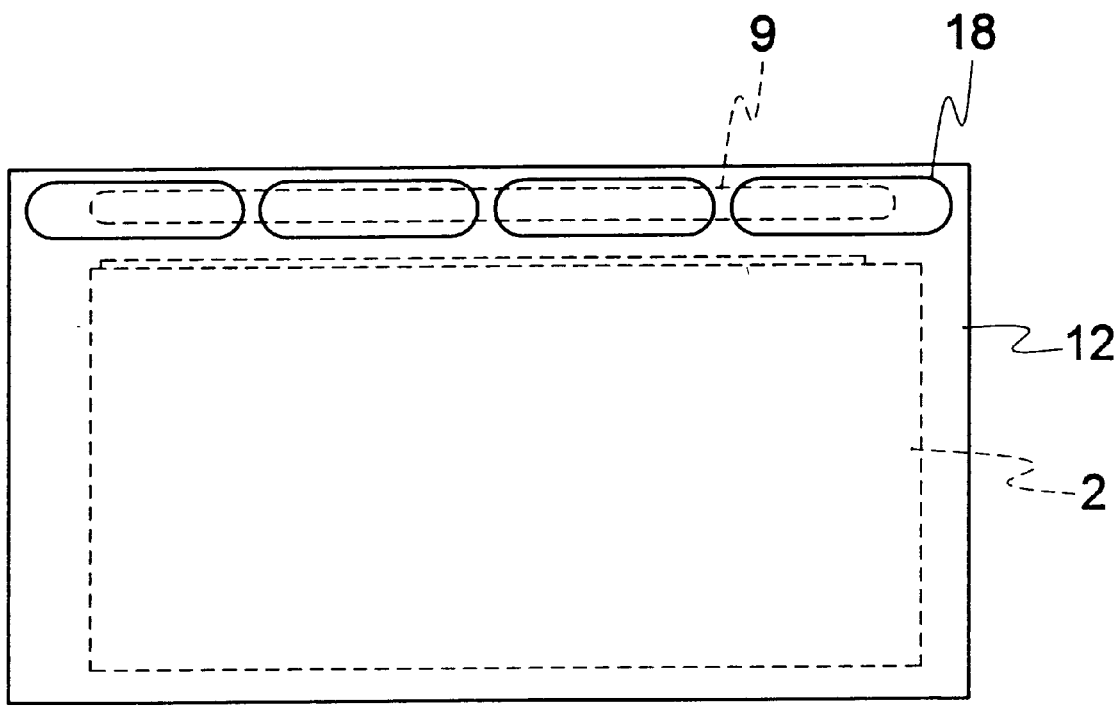
FIG. 2 is a plain view of Embodiment 1 of the present invention.

FIG. 1 is a sectional view showing the configuration of a lamp and its circumference in Embodiment 1 of the present invention. FIG. 2 is a plain view seen from a housing side.

Referring to the drawing, numeral 1 is a polarizer; numeral 2 a liquid crystal display (LCD) panel of a thin film transistor (TFT) or a simple matrix system; numeral 6 a diffusion sheet; numeral 7 a light guide plate made of a transparent material such as acrylic resin; numeral 8 a reflective sheet; numeral 10 a silver coated reflective plate encircling the lamp 9, the upper end of the reflective plate being sandwiched between the diffusion sheet 6 and the light guide plate 7 while the lower end thereof being sandwiched between the reflective sheet 8 and an insulating sheet described later; numeral 11 an insulating sheet; numeral 12 a back metal plate of a metal housing where a swollen portion 18 for including an air gap layer is provided, the swollen portion having a shape departing from the lamp 9 and being formed by swelling a portion adjacent to the reflective plate 10 by deep drawing; numeral 13 a metal housing frame; numeral 14 a front metal plate of the housing; numeral 15 a decorative sheet; numeral 16 a prism sheet; and numeral 17 a bonding material, respectively. Further, numerals 34 to 36 are a groove for allowing a low voltage wiring of the lamp to pass, plastic mold and a frame coated with black ink for preventing directly reflected light from the lamp from being observed, respectively. All the metal housings 12, 13 and 14 have an earth common to the current supply. Further, in FIG. 1, sizes of t11 to t16 are, for example, 0.5 mm (t11), 3.795 mm (t12), 0.3 mm (t13), 0.4 mm (t14), 0.2 mm (t15) and 1 mm (t16), respectively.

Figure 3:
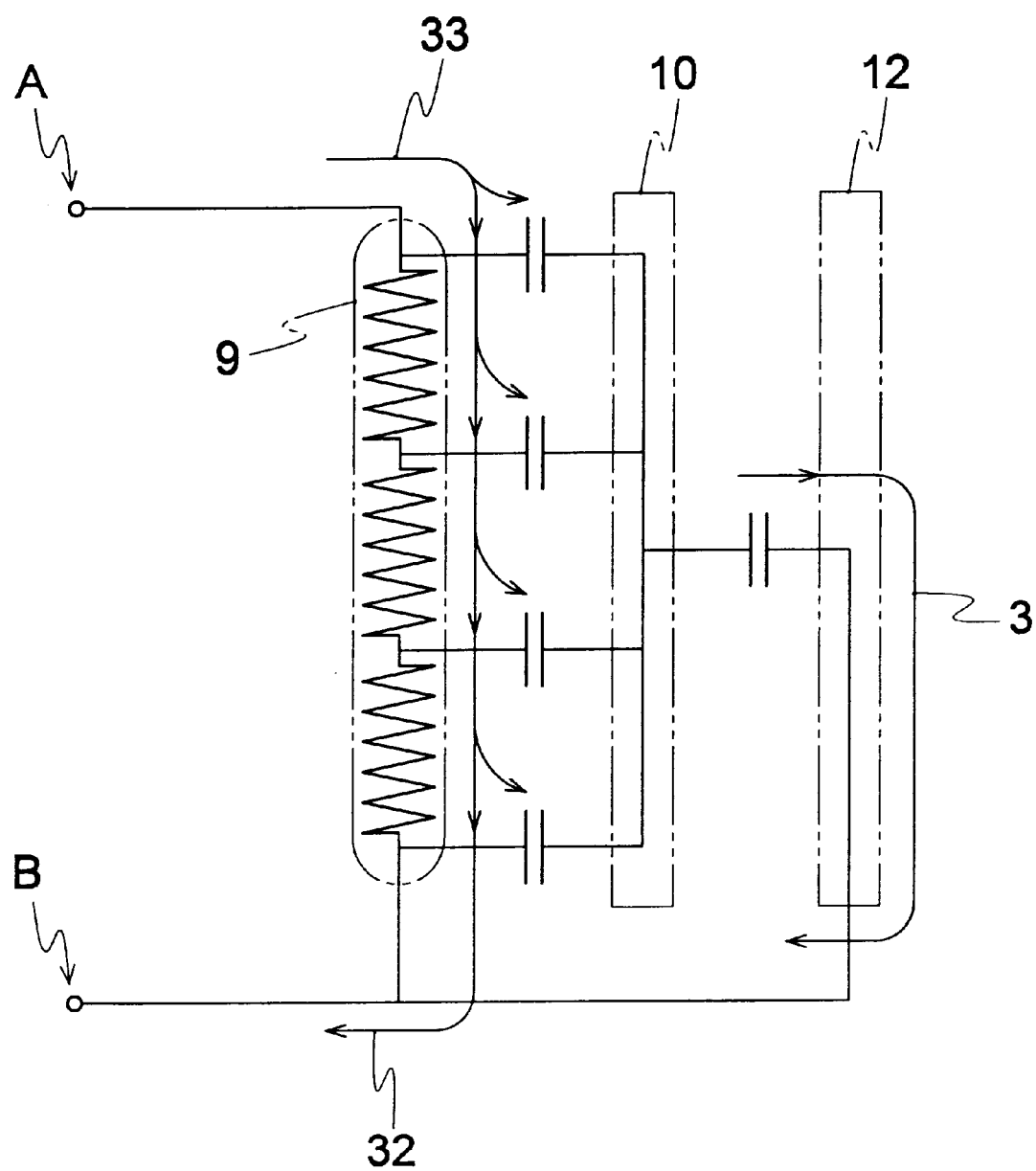
FIG. 3 is a view showing a current supply equivalent circuit in Embodiment 1 of the present invention.
Figure 4:
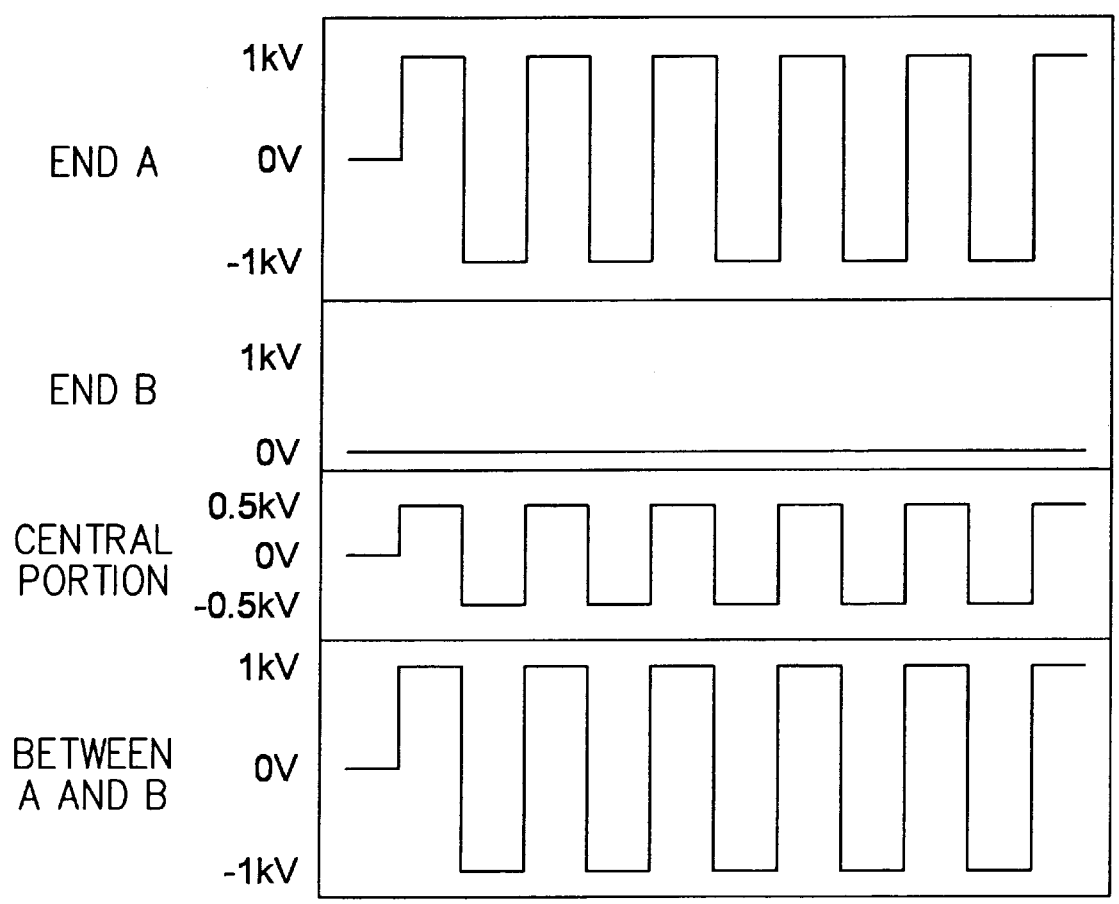
FIG. 4 is a timing chart of a lamp application voltage in Embodiment 1 of the present invention.
Figure 5:
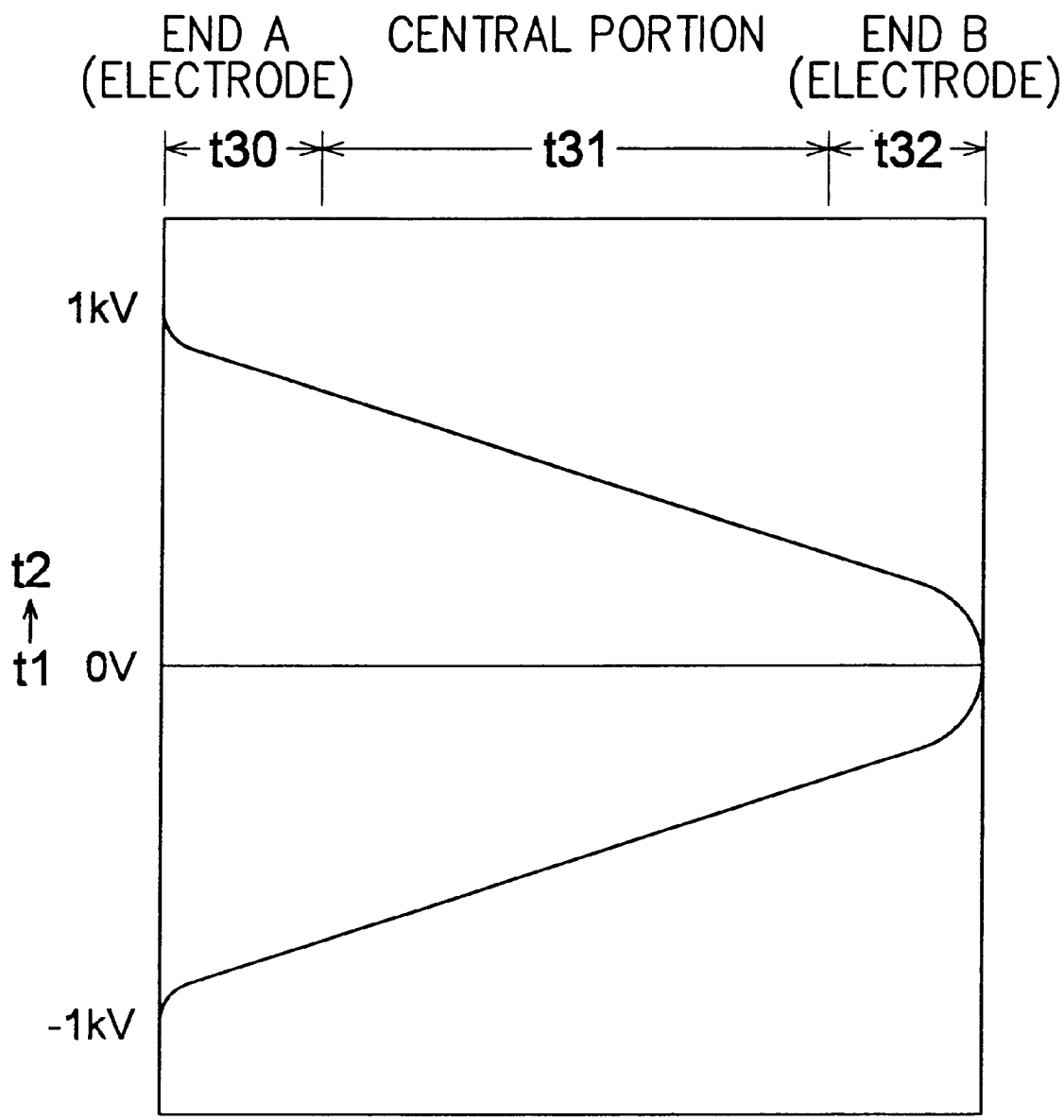
FIG. 5 is a view showing a voltage distribution in an axial direction of the lamp in Embodiment 1 of the present invention.

The operation of the panel unit will be described. FIG. 3 is a view showing a current supply equivalent circuit in Embodiment 1 of the present invention. FIG. 4 is a timing chart of a lamp application voltage in Embodiment 1 of the present invention. FIG. 5 is a view showing a voltage distribution in an axial direction of the lamp in Embodiment 1 of the present invention. In FIG. 5, sizes of t30 to t32 are 5 mm, 280 mm and 5 mm, respectively. A DC power of approximately 5 through 12 V to be provided from a battery is converted into an AC power of 40 through 200 kHz in frequency, and approximately 500 through 1500 V in effective voltage by an inverter (not shown) and is applied to a high voltage terminal A of the lamp 9. The other end B of the lamp 9 is connected with a common potential (earth). The lamp 9 emits light by the high voltage high frequency power. The light emitted from the lamp enters into the light guide plate 7 and spreads on the whole face of the light guide plate 7 while being reflected by the reflective sheet 8. At this time, the periphery of the lamp 9 is surrounded by the reflective plate 10 so as to let more light enter into the light guide plate 7 without waste. In order to move the center of the lamp 9 to the center of the light guide plate 7 as much as possible, the lamp 9 and the light guide plate 7 are positioned with providing a minimum neccessary gap of approximately 0.5 mm to pass light emitted rearwards of the lamp and reflected by the reflective plate 10. Diffusion dots are printed on the reverse face of the light guide plate 7 by a screen printing or the like, and scattered light is radiated in the direction of the front face of the panel. The light coming from the light guide plate 7 is scattered by the diffusion sheet 6 to be equalized, and further is throttled by a prism sheet 16 in a direction vertical to the panel face. Then, the light enters into the liquid crystal panel. In the liquid crystal panel, after the incident light has been polarized by the polarizer 1, the polarizion direction of the light is rotationally shifted for each dot in accordance with the image signal at the liquid crystal to which the voltage has been applied with the driving circuit 5, and the light passes through a color filter. Finally, only the light rotated by 90 degrees in the polarization direction by the polarizer 1 can be transmitted.

At this time, electromagnetic waves of various frequencies can be transmitted from the display control portion of the TFT. They can affect not only peripheral devices, but also circuit of a personal computer and the health of the user badly. In a panel of the present invention, the shielding effect of the electromagnetic waves are so high that the waves of a high frequency cannot be leaked out of the panel, because all the surfaces except for the panel display face are covered with metal housings 12, 13 and 14 where the earth common to the power source is provided. Since the intensity and rigidity (Young's modulus) are higher than those of resin material usually used, the strength and impact resistance are high.

At this time, the reflective plate 10 uses one where a silver thin film is spattered on the whole of one surface of a PET sheet to increase reflectance. Thus, the reflective plate 10 becomes conductive. Between the lamp 9 and reflective plate 10 and between the reflective plate 10 and metal housings 12, 13 and 14 is caused an alternating leakage circuit due to capacity coupling as shown in FIG. 3. A part of of the high frequency power applied to the lamp 9 is branched and therefore the leakage current 31 which flows in the reflective plate 10 plow easier to flow. Thus, the current 32 flowing through a tube is reduced as it approaches toward the lower voltage side B of the lamp 9, thereby reducing the radiating efficiency of the lamp 9 and causing inequality in axial brilliance of the lamp 9. The leakage current 31 which does not contribute to the radiation of the lamp 9 also becomes a load to the power source circuit, thereby increasing the heating and further, reducing the power efficiency. Although the increase of frequency is effective for down-sizing the power source circuit, the increase of frequency increases the leakage current 31 by capacity coupling.

Figure 15:
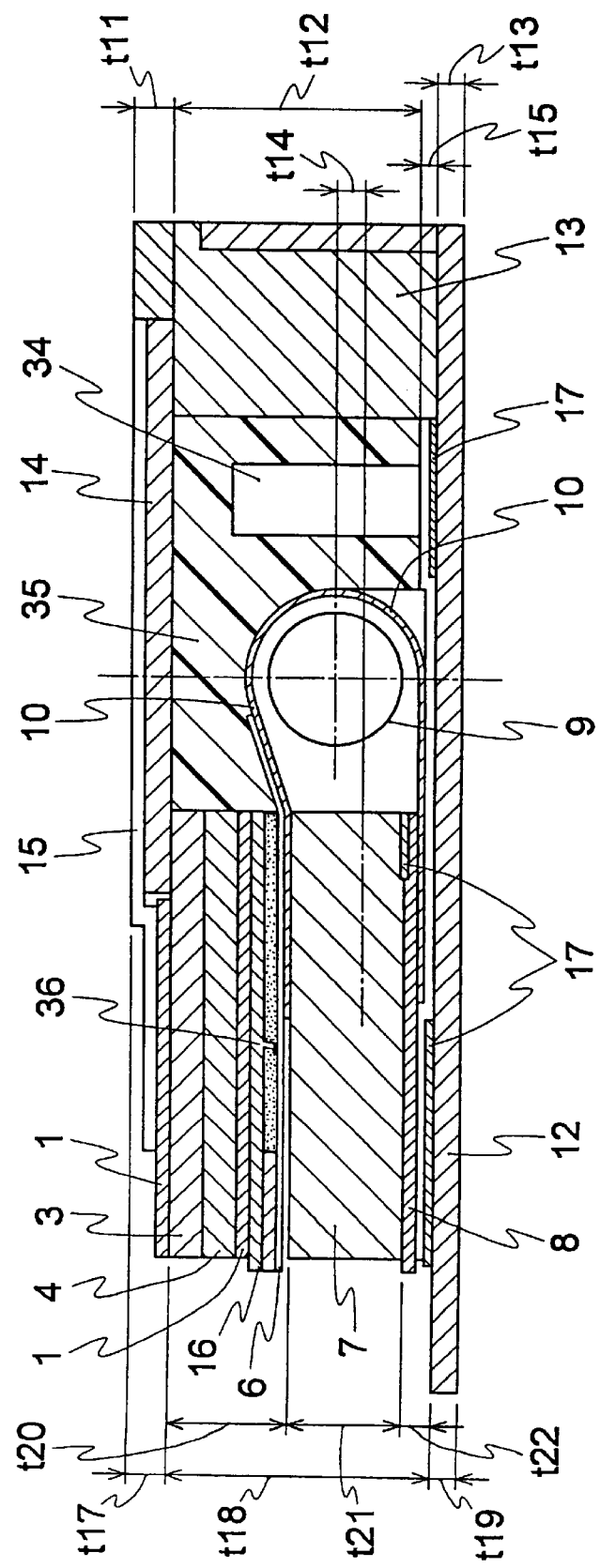
FIG. 15 is a sectional view showing a comparative embodiment for explaining effects of the present invention.

As shown in FIG. 15, the capacity between the reflective plate 10 and metal housings 12, 13 and 14 is decided by a capacity of the superposed portion between the metal housing 12 and reflective plate 10 on the lower side of the light guide plate 7, which is smallest in distance. In the present invention, a swollen portion 18 which is a portion of a shape departing from the lamp 9 is formed on the metal housing 12 of the superposed portion as shown in FIG. 1 and a gap of an air layer is provided with an insulating sheet 11 for compressing being remained, so that electrostatic capacity between the reflective plate 10 and metal housing 12 is reduced.

In the axial configuration of the lamp 9, an earth is generally provided on one end B and the positive or negative voltage is applied to the other end A. In this case, the voltage change near the end A is large as shown in FIG. 5, and becomes the leakage current path between the lamp 9 and reflective plate 10. In order to make the capacity coupling small, a swollen portion 18 is required to be formed over the axial full length of the lamp 9 as shown in FIG. 2, because the capacity between the reflective plate 10 and metal housing 12 is decided by the whole superposed portion between the reflective plate 10 and housing 12.

Figure 6:
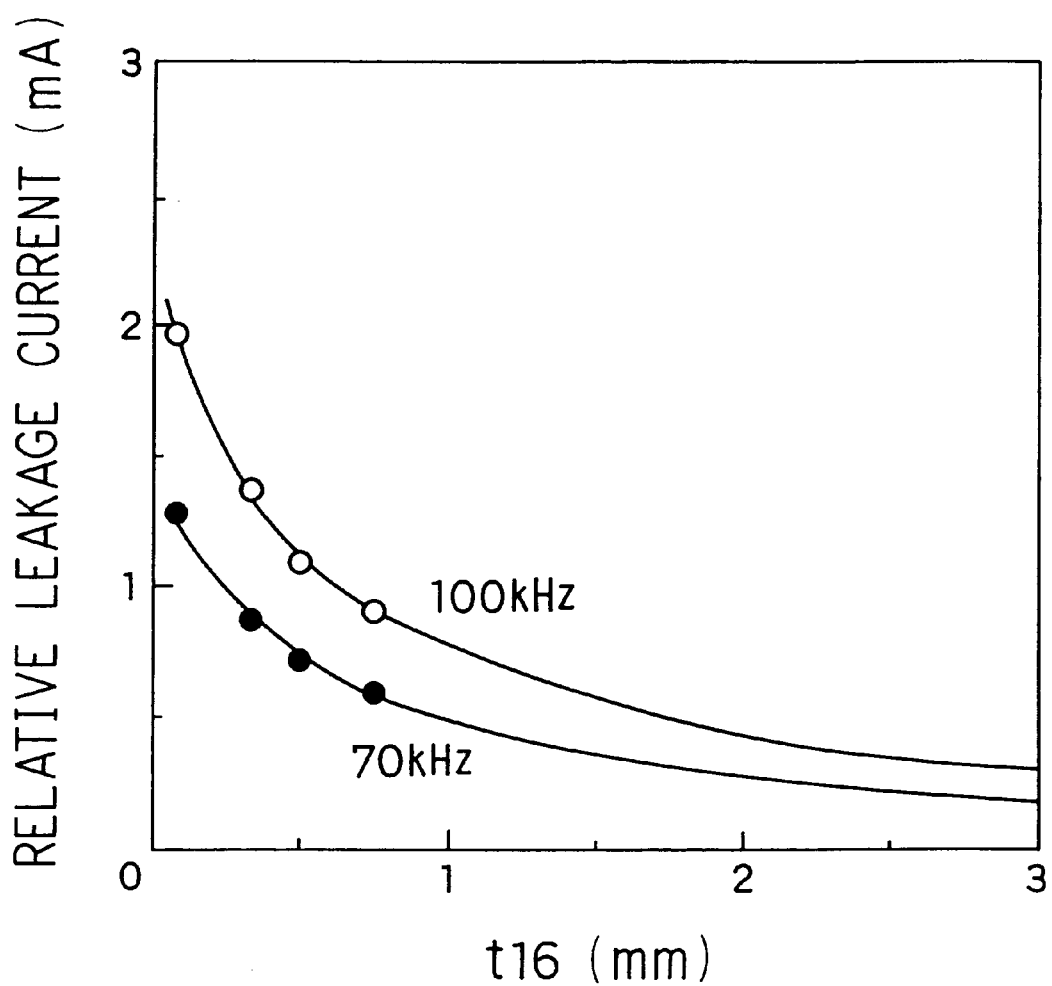
FIG. 6 is a view showing relationship between the swollen thickness and leakage current in Embodiment 1 of the present invention.

FIG. 6 shows a relationship between the thickness t16 of an air layer formed by the swollen portion 18 and the size of the leakage current. The leakage is reduced as t16 becomes larger even when the power source frequency is 70 kHz or 100 kHz. Approximately 0.5 through 2 mm are proper, because the leakage becomes gradually gentle.

Figure 7:
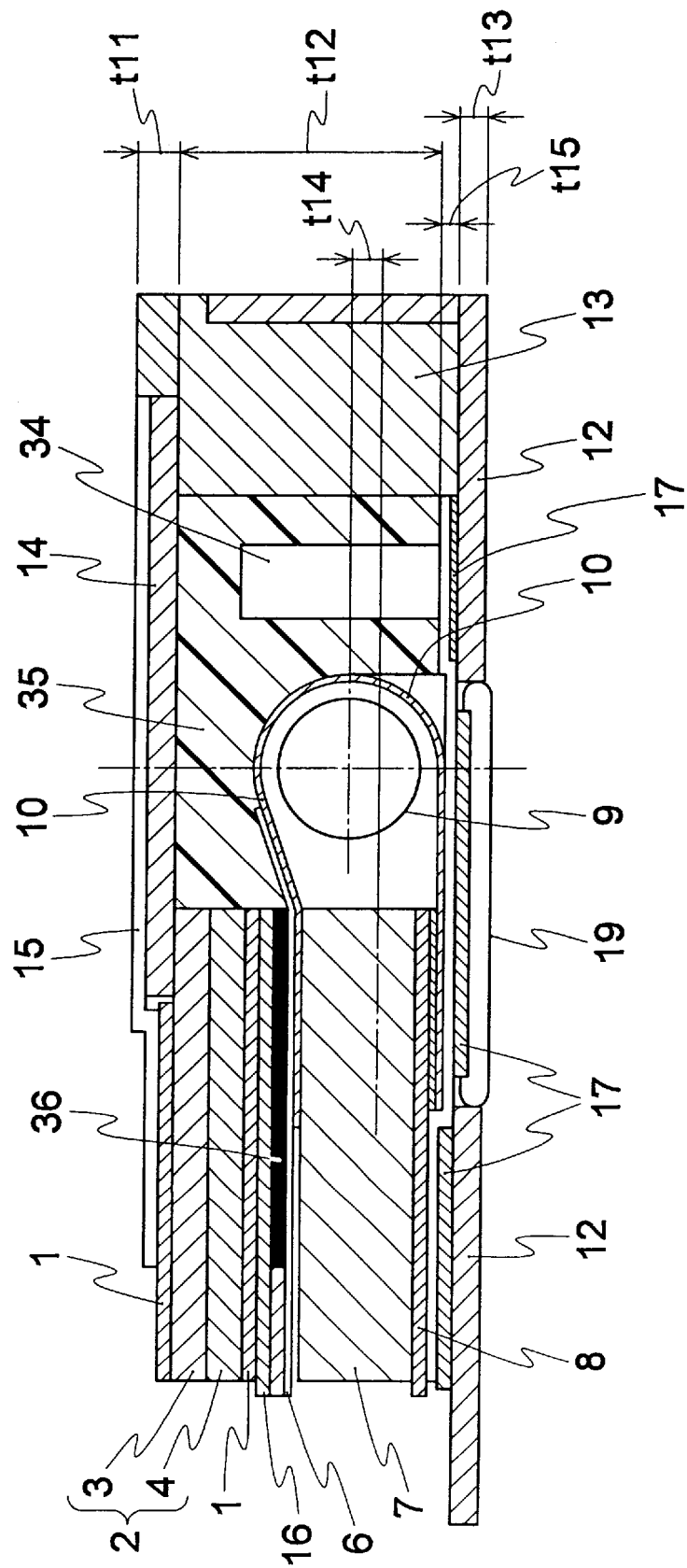
FIG. 7 is a sectional view showing the configuration of a lamp and its circumstance of another metal housing in Embodiment 1 of the present invention.

In FIG. 7, like in the case of a gap, an opening is provided on the superposed portion of the metal housing 12 to be superposed on the reflective plate 10, so as to make the area of a portion equivalent to the capacitor electrode small. Thereby, if the electric capacity is made small between the reflective plate 10 and metal housing 12, a similar effect can be obtained. In FIG. 7, numeral 19 is a seal of insulating material with an opening.

When a reflective plate 10 is an insulating reflective sheet in which a reflective powder such as TiO2 is coated on an insulating film such as PET sheet, there is generated no electrostatic capacity between the reflective plate 10 and lamp 9. The electrostatic capacity related to the leakage current is limited to a capacity formed among the lamp 9 and metal housings 12, 13 and 14, so that the capacity value becomes smaller, thereby reducing the leakage current. Measured values showing the effects of the present invention are shown in Table 1 and FIG. 8. Difference in lamp brilliance in the length direction of the cold cathode tube and in the leakage current value to the metal housing depending on the combination of the reflective plate material quality and the housing configuration is provided respectively.

TABLE 1

| | | | Input voltage: 12 V | | | | | |
|---|---|---|---|---|---|---|---|---|
| Conditions | Reflection plate material | Housing | Imput current (mA) | Power (w) | Lamp current (mA) | Leakage current (mA) | Brilliance (cd/m$^2$) | Efficiency (cd/m$^2 \cdot$ w) |
| a | Ag | FIG. 15 | 509 | 6.11 | 5.50 | 6.87 | 1686 | 276 |
| b | Ag | FIG. 7 | 485 | 5.82 | 5.50 | 4.87 | 1612 | 277 |
| c | Ag | FIG. 1 | 460 | 5.52 | 5.50 | 5.62 | 1621 | 294 |
| d | PET film | FIG. 15 | 456 | 5.47 | 5.62 | 5.12 | 1504 | 275 |
| e | PET film | FIG. 7 | 431 | 5.17 | 5.50 | 4.37 | 1529 | 296 |
| f | PET film | FIG. 1 | 440 | 5.28 | 5.62 | 4.50 | 1550 | 294 |

In the case where the reflective plate 10 shown in FIG. 15 is a silver reflective plate and both an opening and a swollen portion are absent in a metallic housing 12, the leakage current is most in amount as shown in the condition a in Table 1 and FIG. 8(a), and the brilliance is remarkablly lowered from the high voltage side to low voltage side of the lamp. On the other hand, in both conditions b (FIG. 8(b)) when an opening exists in the metal housing as shown in FIG. 7 and condition c (FIG. 8(c)) when a swollen portion exists as shown in FIG. 1, even in the case of the same silver reflective plate, the leakage current is reduced and the distribution is remarkably equalized. Further, also in the case where an insulating material (PET film) is used as a reflective plate 10, the condition e (FIG. 8(e)) when an opening exists in the metal housing and condition f (FIG. 8(f)) when a swollen portion exists show reduced leakage current and equalized brilliance distribution as compared with condition d (FIG. 8(d)) in the case of a flat metal plate without an opening and a swollen portion.

Embodiment 2

Figure 9:
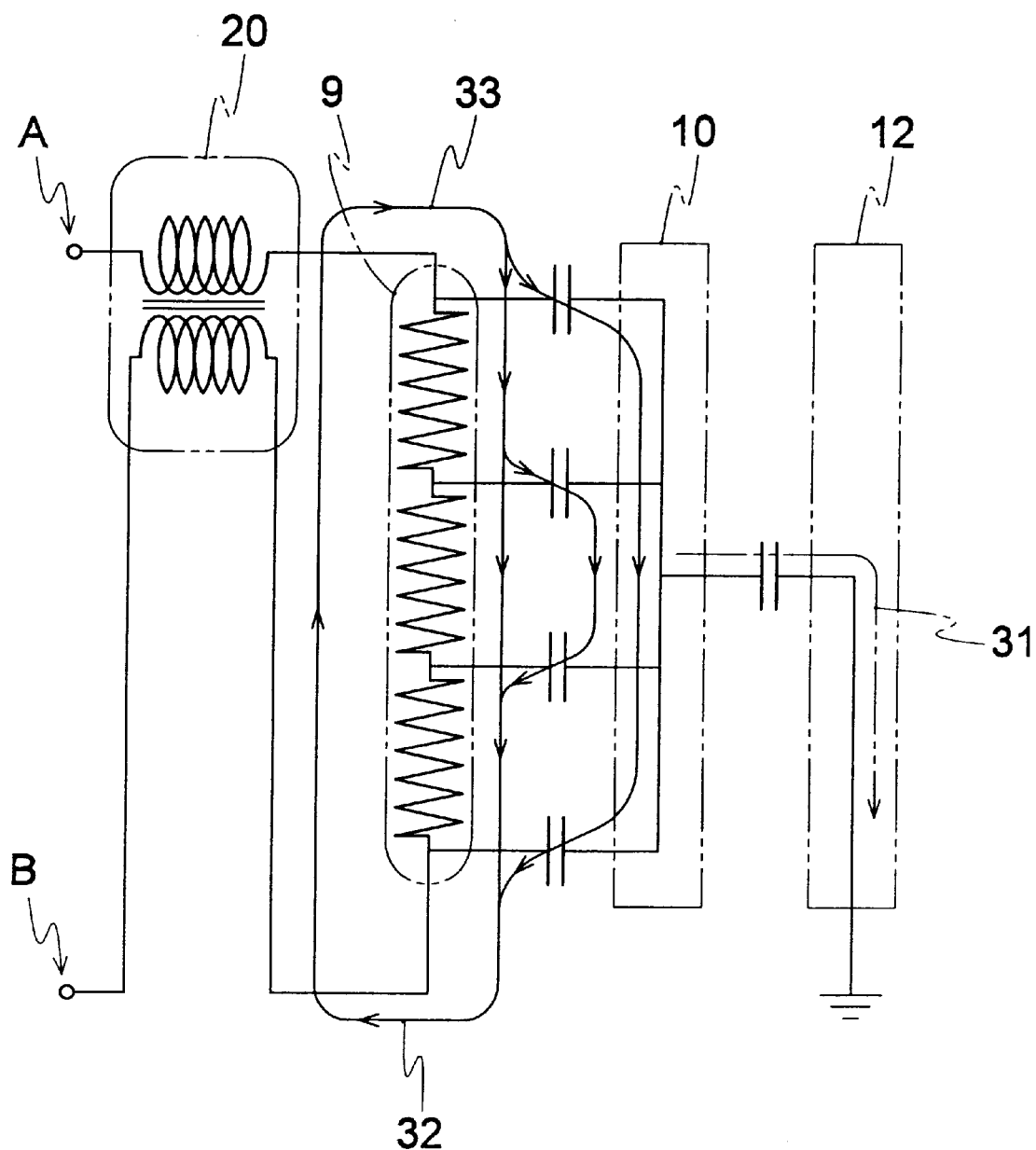
FIG. 9 is a view showing connection between the high frequency current supply and lamp in Embodiment 2 of the present invention.
Figure 14:
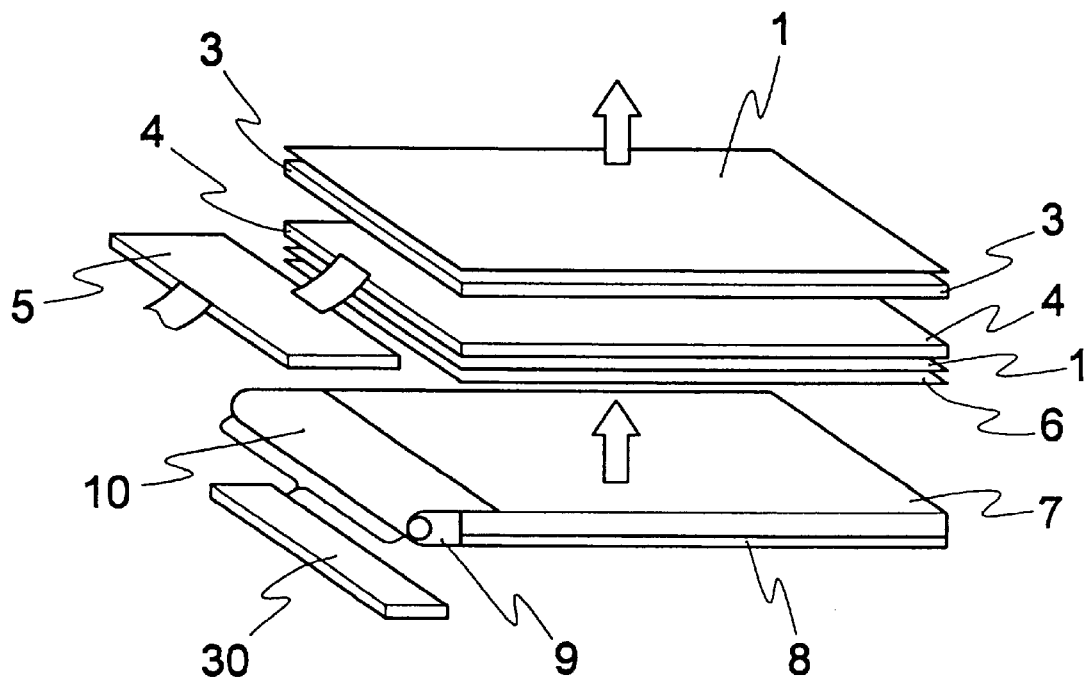
FIG. 14 is a basic configuration view of a conventional liquid crystal panel unit.

FIG. 9 is a view showing connection between the high frequency power source and lamp in Embodiment 2 of the present invention. In Embodiment, a common mode choke 20 is inserted between the inverter 30, (shown in FIG. 14) which is a high frequency power source, and a lamp 9. Input and output wirings of the common mode choke 20 are provided so that the leakage current 31 into the metal housing would not pass the common mode choke 20.

The operation will be described. The common mode choke 20 for passing electric current flowing a high frequency power source circuit from the inverter to the fluorescent lamp and a circuit returning to the inverter from the low voltage side can reduce the leakage current 31 which enters from the high voltage side of the lamp, passes through the reflective plate and metal housing and escapes to an earth (dotted lines of FIG. 9), because the common mode choke 20 is so operated that a current 33 entering into the lamp becomes equal to a current 32 coming out thereof, and the current flowing the lamp forms a loop. When a common mode choke is used, the voltage appearing on both ends of the lamp becomes an antiphase voltage of approximately ±0.5 kV even when the high frequency voltage of ±1 kV is applied to the power source terminal A, thereby remarkably reducing the leakage current. Especially when the frequency is 200 kHz or more, the leakage current 31 can be effectively restrained by the common mode choke 20 of a volume of approximately 1 cc.

Embodiment 3

Figure 10:
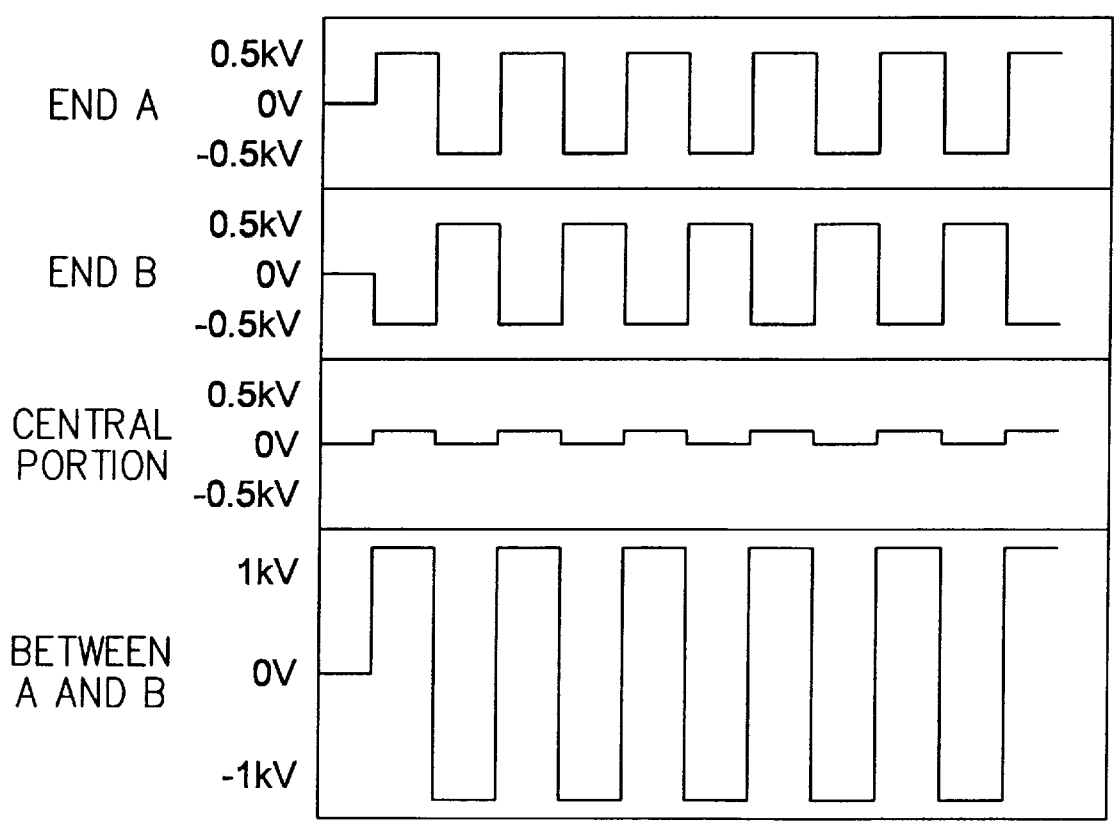
FIG. 10 shows a timing chart of a lamp application voltage in Embodiment 3 of the present invention.
Figure 11:
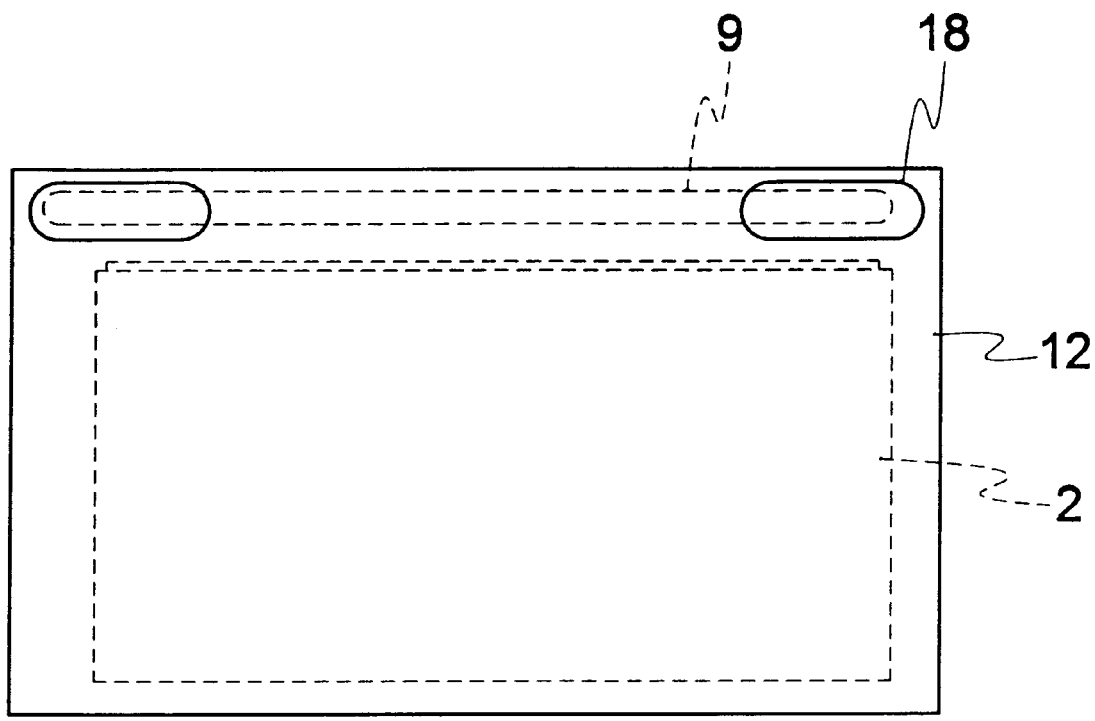
FIG. 11 is a plain view of Embodiment 3 of the present invention.

FIG. 10 shows a timing chart of the voltage application to the lamp 9 in Embodiment 3 of the present invention, and FIG. 11 is a plain view of a metal housing. In the present Embodiment, when applying alternating current voltage to the cold cathode tube lamp 9, there is employed a voltage application system of a mode in which the antiphase positive and negative voltages of an equal absolute value are alternately and repeatedly applied to electrodes on both ends of the lamp. Thus, the absolute value of the voltage to be fed to the lamp 9 can be reduced to one seconds and the leakage current can be made smaller. At this time, a reflective plate 10 encircling the lamp 9 is made of an insulting reflective plate, and at the same time, a swollen portion 18 of the metal housing is provided by deep drawing only in a position opposite to both electrodes of the lamp ends as shown in FIG. 11, thereby reducing electrostatic capacity between the electrode of the lamp 9 and metal housing 12.

Figure 12:
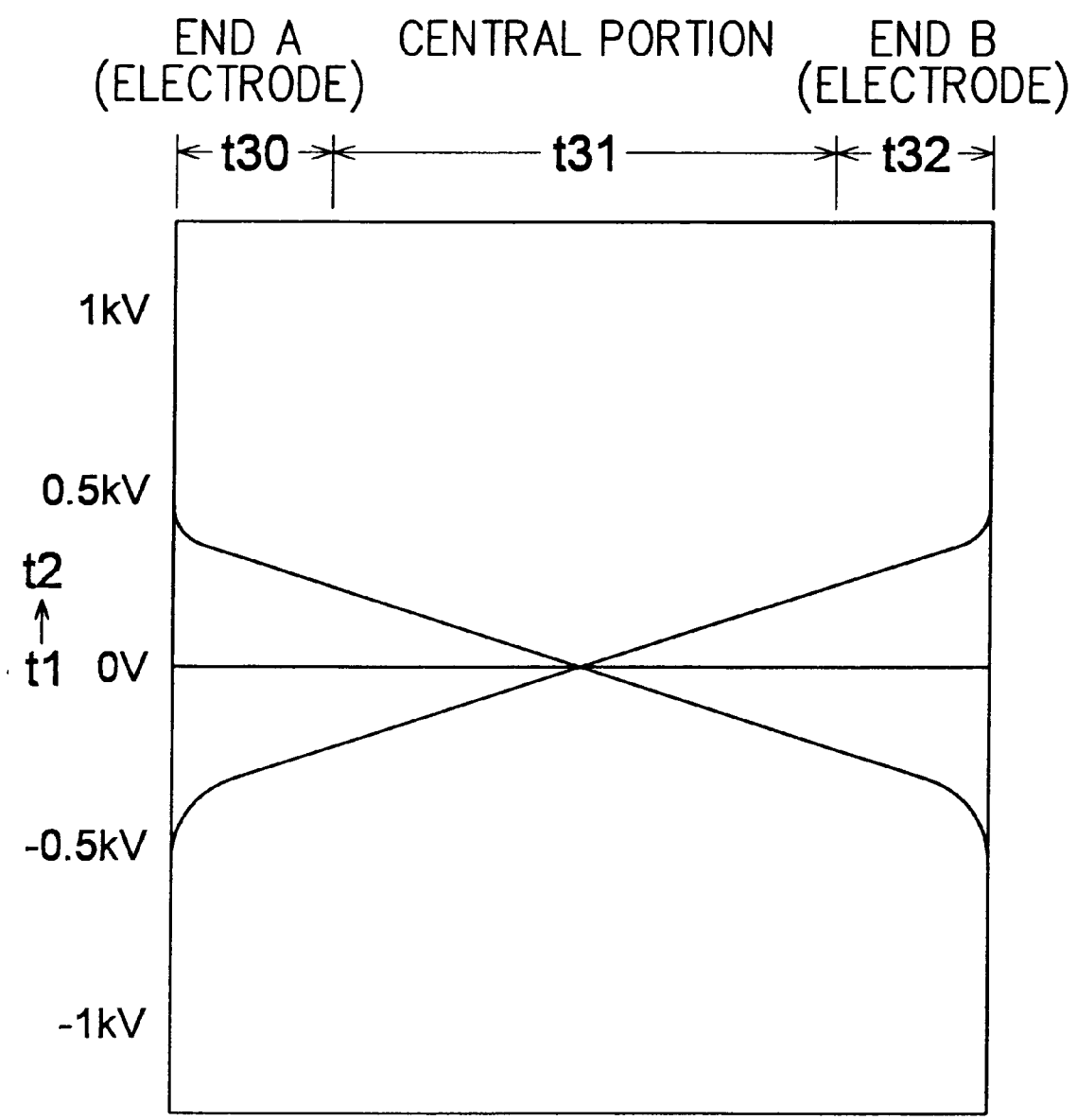
FIG. 12 is a view showing a voltage distribution in an axial direction of the lamp in Embodiment 3 of the present invention.

The operation will be described. FIG. 12 shows voltage distribution in the length direction of the lamp 9 when applying voltage to the lamp 9 of Embodiment 3 of the present invention In FIG. 12, sizes of t30 to t32 are 5 mm, 280 mm and 5 mm, respectively. As shown in FIG. 12, the amount of voltage change in a portion near both electrodes of the lamp is large. A swollen portion 18 is provided by deep drawing on the housing metal near the electrodes so that the electrostatic capacity between the portion of the lamp 9 near electrode thereof and the metal housing 12 is small. Although the electrostatic capacity between the lamp 9 and metal housing 12 in the lamp center portion is large, the voltage amplitude is small. Thus, the leakage current is restrained respectively. At this time, the similar effect can be obtained by providing an opening only to the vicinity of the electrode of the lamp 9, instead of the swollen potion 18 to reduce the electric capacity between the electrode of the lamp 9 and metal housing 12.

Figure 13:
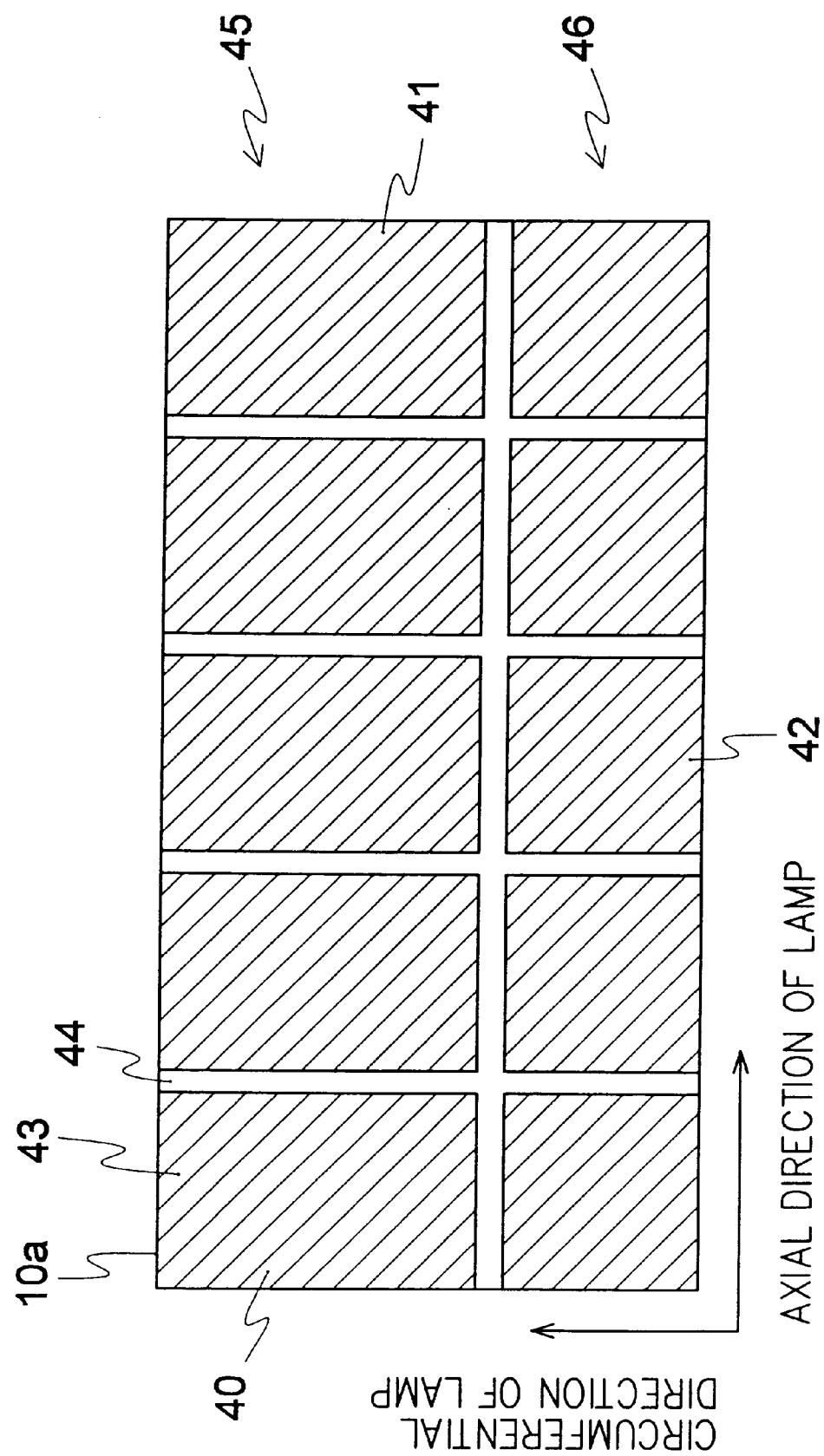
FIG. 13 is a view showing a pattern of a silver thin film to be applied to a reflective plate in Embodiment 3 of the present invention.

When a reflective plate encircling the lamp is a reflective plate 10a in which a metal reflective film of silver or the like is formed on an insulating reflective plate with the film being divided into a plurality of areas which are mutually insulated, as shown in FIG. 13, the insulating portion of the reflective plate 10a prevents a capacity formed between the A and B areas 40,41 of the reflective plate 10a and the portion near electrode of the lamp 9, and a capacity formed between the C area 42 of the reflective plate 10a at a central portion of the lamp 9 and the metal housing 12 from being coupled in series, thereby offering a similar effect to that when using the insulating body in the reflective plate 10. In FIG. 13, numerals 43 to 46 are an Ag thin film portion, an insulating portion, a portion encircling the lamp, and a superposed portion with the metal housing 12, respectively. In this case, a high reflectance of silver can be used, so that the reflectance of the reflective plate 10a is high, which increase panel brilliance.

Embodiment 4

In the above Embodiments described so far, a metal sheet plate is used for the housing. When a composite material wherein a metal knit having a mesh of approximately 1 through 5 mm and formed with metal wires of about 0.1 through 1 mm in diameter is embedded in an insulting resin plate is used, it has a function of shielding electromagnetic waves like the metal plate, and further realizes a leakage current restrain by the reduction in the coupling capacity to the lamp.

According to the display panel apparatus of the first configuration of the present invention, a portion having a shape departing from the lamp such as a swollen portion is provided in a portion of the housing adjacent to the lamp. Therefore, the electrostatic capacity between the reflective plate and housing can be made smaller and the leakage current due to capacity coupling can be reduced, thereby improving equalization of the lamp illumination and reducing the load of the high frequency power source.

According to the display panel apparatus of the second configuration of the present invention, an opening is provided in a portion of the housing adjacent to the lamp. Therefore, the electrostatic capacity between the reflective plate and housing can be made smaller and the leakage current due to capacity coupling can be reduced, thereby improving equalization of the lamp illumination and reducing the load of the high frequency power source.

According to a display panel apparatus of the third configuration of the present invention, the housing is made of an insulating thin plate with a metal mesh being embedded therein. Thus, the electrostatic capacity can be further reduced, and the electromagnetic shielding function can be also provided.

According to a display panel apparatus of the fourth configuration of the present invention, a reflective plate encircling the lamp is made of insulating body, thereby further reducing the electrostatic capacity between the lamp and housing.

According to the display panel apparatus of the fifth configuration of the present invention, the reflective plate is formed with the use of a metal film divided into a plurality of areas which are electrically insulated to one another, so that the electrostatic capacity between the lamp and housing is further reduced.

According to the display panel apparatus of the sixth configuration of the present invention, a common mode choke is inserted between the high frequency power source and lamp, so that the leakage current from the lamp to the housing is prevented by the common mode chalk to be reduced.

According to display panel apparatus of the seventh configuration of the present invention, the positive and negative voltages in antiphase are applied alternately to both ends of the lamp, so that the absolute value of application voltage to the common potential can be reduced by half.

According to a display panel apparatus of the eighth configuration of the present invention, in a configuration wherein potential change is small at central portion of the lamp, a portion having a shape departing from the lamp, or an opening is provided only in a portion of the housing opposite to both ends of the lamp having a potential change, so that the leakage current can be reduced while preventing the housing size from being increased.

What is claimed is:

1. A display panel apparatus comprising:
   a transmission type liquid crystal panel,
   a lamp provided adjacent to at least one side of a light guide plate for guiding illumination light to the crystal panel,
   a high frequency current supply for providing a lighting current to the lamp,
   a reflective plate provided to encircle the lamp to introduce illumination light of the lamp to the light guide plate, and
   a housing composed of a metal thin plate, each portion of the housing being connected with a common electric potential, wherein the high frequency current supply comprises a current supply for simultaneously applying alternating positive and negative voltages in antiphase to both ends of the lamp.

2. The display panel apparatus of claim 1, wherein the housing comprises respective portions being spaced from said reflective plate provided only in a position opposite to both end portions of the lamp.

3. The display panel apparatus of claim 1, wherein the housing comprises:
   a first portion, said liquid crystal panel being disposed between said lamp and first portion; and
   a second portion disposed opposite to said first portion, said lamp and said liquid crystal panel being disposed between said first and second portions;
   said second portion having a first section spaced from said lamp by a first distance and a second section located only opposite said lamp spaced from said lamp by a second distance greater than said first distance.

4. The display panel apparatus of claim 1, wherein the housing comprises:
   a first portion, said liquid crystal panel being disposed between said lamp and first portion; and
   a second portion disposed opposite to said first portion, said lamp and said liquid crystal panel being disposed between said first and second portions;
   said lower portion having a first section capacitively coupled to said lamp by a first capacitance and a second section located only opposite said lamp capacitively coupled to said lamp by a second capacitance less than said first capacitance.

5. The display panel of claim 1, wherein the housing comprises:
   a raised rib-shape portion disposed adjacent to said lamp.

6. The display panel of claim 5, wherein said raised rib-shaped portion comprises a plurality of rib-shaped sections disposed adjacent to said lamp.

7. The display panel of claim 5, wherein said raised rib-shaped portion comprises a pair of rib-shaped sections disposed adjacent to respective ends of said lamp.

* * * * *